Figure 1:
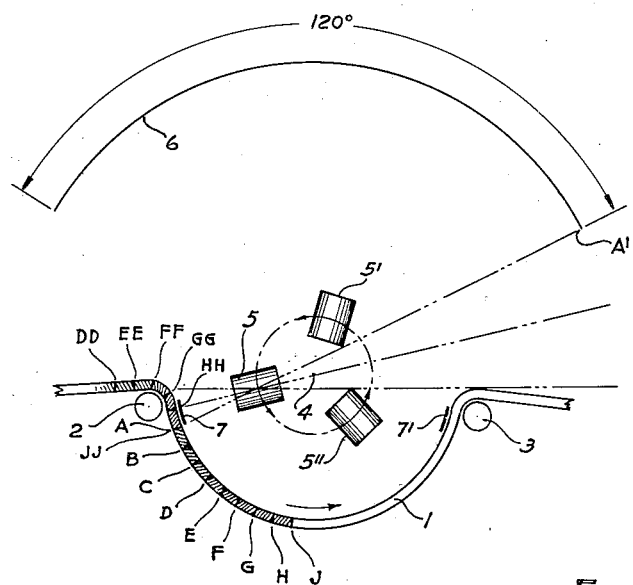

Jan. 8, 1946.  F. WALLER ET AL  2,392,440
METHODS AND APPARATUS FOR PROJECTING MOTION PICTURES
Filed March 25, 1944   4 Sheets-Sheet 1

Fred Waller
Willis Robert Dresser  INVENTOR.
BY
Emery, Varney, Whittemore & Dix
ATTYS.

Jan. 8, 1946.   F. WALLER ET AL   2,392,440
METHODS AND APPARATUS FOR PROJECTING MOTION PICTURES
Filed March 25, 1944   4 Sheets-Sheet 2

INVENTOR.
Fred Waller
Willis Robert Dresser
BY
Emery, Varney, Whittemore & Dix
ATTYS.

Patented Jan. 8, 1946

2,392,440

UNITED STATES PATENT OFFICE 2,392,440

METHOD AND APPARATUS FOR PROJECTING MOTION PICTURES

Fred Waller, Huntington, N. Y., and Willis Robert Dresser, Long Hill, Conn.

Application March 25, 1944, Serial No. 528,044

8 Claims. (Cl. 88—16.8)

This invention relates to methods and apparatus for projecting motion pictures and has as an object the provision of what may be called a scanning method of projection in which a beam of light is caused to move progressively across the area of the film frame being projected, so as to illuminate the film frame progressively to project an image in successive increments across the screen, and in which the film is advanced continuously (non-intermittently), with the movement of the beam of light so coordinated with the continuous movement of the film that each successive image is projected onto the screen as a stationary image.

The invention is particularly applicable to panoramic or wide angle projection in which it is desired to project an image onto a concave curved screen, as for example a cylindrical or spherical screen and in which it is desired to project an image over a wide arc of said screen, say 90° or more in the horizontal plane, and over any suitable arc in the vertical plane.

The invention to be described hereinafter constitutes improvements on the invention set forth in our copending application Serial No. 520,592, filed February 1, 1944. In our copending application, the film to be projected was fed continuously (non-intermittently) through a curved gate or other suitable curved guide means adapted to hold the portion of the film to be projected in cylindrical shape. An optical lens system was employed to focus the projected image on the screen, and such lens system was mounted to rotate in line with a beam of light and in timed relation to the movement of the film to project stationary images on the screen. The optical lens system was so located that its optical center coincided with its axis of rotation. With an optical lens system so located it was necessary, as specified in said application to use a beam of light for projection purposes which was relatively narrow lengthwise of the film; otherwise distortion of the projected image may occur on both sides of the center of the beam.

It is an object of the present invention to provide methods by which a wider beam of light may be used for such projection without causing such distortion of the projected image, thus making it possible to increase the clarity and brilliance of the projected image.

Other objects and advantages of the invention will appear hereinafter.

A preferred embodiment of the invention selected for purposes of illustration is shown in the accompanying drawings, in which, Figures 1 to 5 inclusive are plan diagrammatic views showing the invention as applied to the case of a symmetrical lens system.

Figure 6:
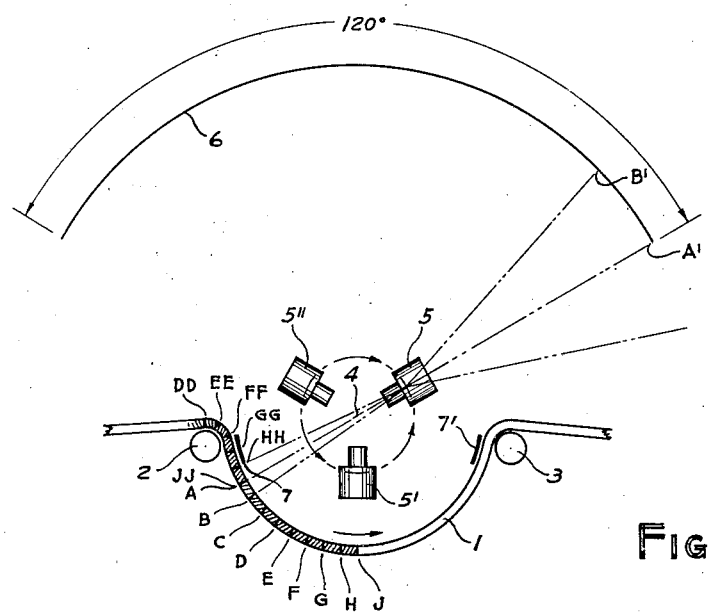
Figure 7:
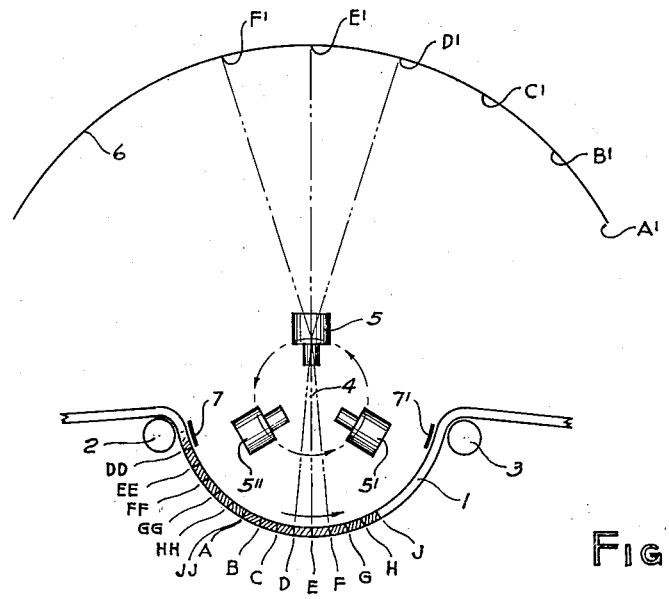
Figure 8:
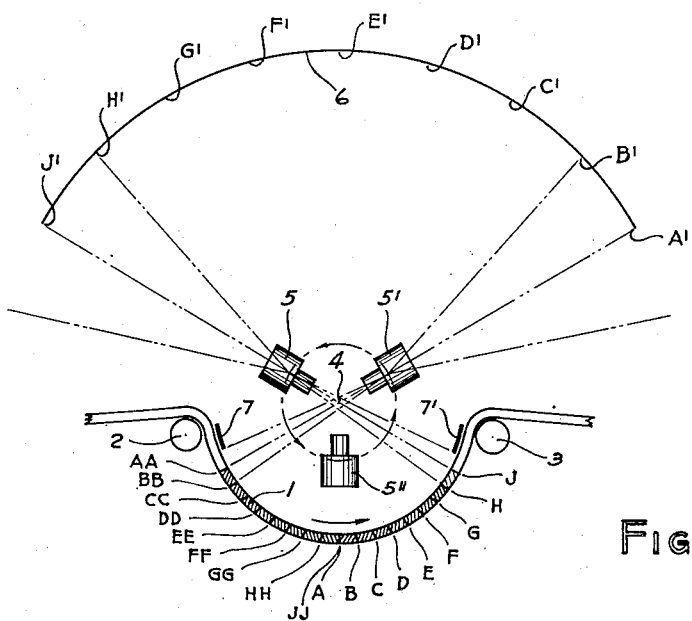

Figures 6 to 8 inclusive are similar views showing the invention as applied to the case of a non-symmetrical lens system.

According to the present invention, as in our copending application, previously referred to, the film to be projected is fed continuously (non-intermittently) through a curved gate or other suitable curved film guide means adapted to hold the portion of the film to be projected in cylindrical shape. Normally, unless optical corrective means are provided, the center of curvature of the gate should coincide with the center of curvature of the screen, and for reasons explained hereinafter, the gate will be provided with an aperture covering an arc somewhat greater than the arc of the projection area of the curved screen on which the pictures are to be projected. Theoretically, the method is adapted to projection onto a screen having a projection area covering an arc of 180°, or even more, but in practice it is seldom desirable to project over an arc exceeding 180°, and due to mechanical limitations, and particularly to interference with the projection beam by the film guiding and feeding means located at the ends of the gate, the usual projection area will be somewhat less, as for example, between 90° and 150°. It will be understood, of course, that in the following description we use the term "aperture" in a broad sense to refer to the space through which the light beam is allowed to pass through the film for projection purposes.

Unlike the disclosure of our copending application previously referred to, the light passing through the film and gate aperture to project the film image onto the screen is not in the form of a relatively narrow beam lengthwise of the film, i. e. in the direction of movement thereof, but is a relatively wide beam extending along a substantial length of the film as held in the gate. Such beam also extends transversely across the full width of the film. Suitable means such as reflectors, lenses or masks are provided for concentrating light emanating from a light source into a beam of this form. Such a beam is rotated to move along the film in the same direction that the film is moved through the gate, but at an angular velocity greater than the angular velocity of the film in the gate.

A single beam or a plurality of such beams may be employed to scan successive film frames as hereinafter explained, and for each such beam, a suitable optical lens system is provided, rotating with its respective beam, to pick up and focus on the screen the light passing through said film. According to the present invention, the nature of the lens system is selected and the position of the lens system is adjusted in accordance with principles hereinafter set forth in order to permit the use of a relatively wide beam of light without causing distortion of the projected image.

In practice, in order to project a stationary image onto the screen from the continuously moving film, certain relationships must be observed between the angular velocity of the film through the gate, the angular velocity of the light beam, the extent of arc of the projection area of the screen and the angular distance between successive film frame centers when held in the curved gate. If we represent the angular velocity of the film through the gate by $V^f$, the angular velocity of the light beam by $V^b$, the arc of the projection area of the screen by A and the angular distance between successive frame centers by F, such relationships may be expressed by the formula $$\frac{V^b}{V^f} = \frac{A}{A-F}$$

The linear distance between successive frame centers can be readily calculated, of course, for a curved gate of any given radius.

Furthermore, the spacing between successive light beams must be properly related to the other factors as above described. If we represent the angular distance between successive light beam centers by D, such relationship may be expressed by the formula $$D = F\frac{A}{A-F}$$

or $$D = F\frac{V^b}{V^f}$$

Applying these formulas to specific conditions, it will be seen that if the projection area of the screen extends through an arc of 120° and the successive film frames are spaced at 60° between centers when held in the curved gate, the ratio of light beam velocity to film velocity will be two to one, and successive light beams should be spaced 120° apart. If the projection area of the screen remains 120°, but the film frames are spaced at 90° between centers, the ratio of light beam velocity to film velocity will be four to one, and successive light beams should be spaced 360° apart. Likewise, if the projection area of the screen remains 120° but the film frames are spaced at 30° between centers, the ratio of light beam velocity to film velocity will be four to three and successive light beams should be spaced 40° apart.

In practice, bearing in mind that the successive light beams are picked up and focused by suitable optical lens systems rotating with the respective light beams, and in order to avoid interference with the light beams by the lens holders, it is advisable to select factors such that an odd number of equally spaced light beams and lens systems are required. For example, if a single lens system is required, there will be no interference. Likewise if an odd number of equally spaced lens systems such as three, five or seven is required, the beam may be projected between opposite pairs of lens holders, thus avoiding mechanical complications.

In the practice of the present invention, the selection of proper lens systems and the location of the selected lens systems with respect to their center of rotation is of critical importance in permitting the use of a wide beam of light without causing distortion of the projected image. The principle to be observed is that the lens system must be so located that the ratio of the arc of the screen subtended by the exit angle thereof to the arc of the gate (or film) subtended by the entrance angle thereof is equal to the ratio of the total arc of the projection area of the screen to the angular distance between successive film frame centers while held in the gate. That is, if the arc of the screen subtended by the exit angle of the lens system is represented by X and the arc of the gate (or film) subtended by the entrance angle of the lens system is represented by Y, the essential relationship is expressed by the formula $$\frac{X}{Y} = \frac{A}{F}$$

In the case of a symmetrical lens system, i. e. one in which the entrance and exit angles are equal, the location of the optical center of the lens system with reference to the center of rotation may be determined graphically or by experiment. It may also be calculated by the following formula in which N represents the distance of the optical center of the lens system from the center of rotation, R represents the radius of curvature of the screen, $r$ represents the radius of curvature of the gate, and X and Y represent the subtended arcs of the screen and gate, respectively, as before:

$$N = \frac{Rr \sin\left(\frac{X-Y}{2}\right)}{R \sin\frac{X}{2} + r \sin\frac{Y}{2}}$$

In the case of a non-symmetrical lens system, i. e. one in which the entrance and exit angles are unequal, the location of the lens system must be determined with reference to the entrance and exit angles of the system selected. That is, as previously set forth, it must be so located that the ratio of the arc of the screen subtended by the exit angle thereof to the arc of the gate subtended by the entrance angle thereof is equal to the ratio of the total arc of the projection area of the screen to the angular distance between successive film frame centers. For example, assuming a ratio of total arc of the projection area of the screen to the angular distance between successive film frame centers of two to one, if a non-symmetrical lens system is selected having an exit angle of 30° and an entrance angle of 15°, such system should obviously be located with its optical center coincident with the center of rotation, for in that case since the exit and entrance angles are in the ratio of two to one, the subtended arcs of the screen and gate will also be in the ratio of two to one where the optical center of the lens system is so located. But if, under the same conditions, a non-symmetrical lens system is selected having an exit angle of 30° and an entrance angle of 10°, such system should be located with its optical center removed from the center of rotation a distance sufficient to bring the subtended arcs of the screen and gate to the required ratio of two to one. This distance may be determined by calculation or graphically or by experiment.

One additional departure from the disclosure of our copending application Serial No. 520,592 may be mentioned. In said application, it was assumed that in utilizing a narrow beam of light the arc of the gate aperture would be substantially equal to the total arc of the projection area of the screen. In utilizing a wider beam of light in accordance with the present invention, however, we find it advantageous to increase the gate aperture by an amount equal to the arc of the gate which is subtended by the entrance angle of the lens system. By so doing, the projected image will be of substantially equal brilliance over the total arc of the projection area of the screen, rather than of diminishing brilliance near the edges as would be the case if said arcs were equal.

Two specific embodiments of the invention are illustrated in the drawings, Figures 1 to 5 inclusive illustrating the case of a symmetrical lens system, and Figures 6 to 8 inclusive illustrating the case of a non-symmetrical lens system.

In both cases the projection area of the screen is shown as an arc of 120° and the successive film frames are spaced 60° between centers, i. e. each film image frame extends through an arc of 60° while held in the gate. Under these conditions the ratio of light beam velocity to film velocity should be two to one and successive light beams should be spaced 120° apart. Also the ratio of the subtended arcs of the screen and gate should be in the ratio of two to one, and in both cases the subtended arc of the screen is shown as 30° and the subtended arc of the gate (or film) is shown as 15°. Furthermore, for reasons previously explained, the gate aperture, instead of being 120°, has been increased by 15° to a total aperture of 135°. In both cases, three lens systems are shown, spaced 120° apart, said lens systems being mounted on a common frame or carrier for rotation on an axis passing through the center of curvature of the gate.

Under these conditions, with the beams moving at twice the velocity of movement of the film, each beam will scan one entire frame length of film in the gate while the beam is moving the entire length of the gate aperture. For example, referring to Figure 1, assuming the film at a position where the trailing edge of a given frame of film is in line with the entrance edge of the gate aperture and in line with the advancing edge of the wide beam of light, since the film frame occupies 60° of the gate aperture, it needs to move 75° to bring its leading edge into line with the exit edge of the gate aperture. Accordingly with the light beam moving at a rate bearing a ratio of two to one to the rate of movement of the film, it will be apparent that by the time the film has moved 75° the light beam will have moved 150°. Thus the entire length of one film frame will have been scanned by the entire width of the beam during such movement and the image of said film frame will have been projected progressively in successive increments across the 120° projection area of the screen. Thus the 60° image of the film frame has been projected over 120° of arc of the screen.

The image so projected onto the screen will appear thereon as a stationary image despite the continuous motion of the film and the continuous motion of the beam of light, as will appear from consideration of the diagrams of Figures 1 to 5 inclusive.

In Figures 1 to 5, the film strip is designated by 1. Said film passes over a guide roller 2 and over a feed sprocket 3 adapted to feed the film strip continuously at a constant rate. Between the guide roller 2 and the feed sprocket 3, the film strip passes through a curved gate (not shown structurally in these figures) which holds the portion of the film to be projected in cylindrical form, with the axis of the cylinder coinciding with the axis of rotation 4 of the lens holders 5, 5' and 5", each containing a suitable symmetrical lens system for focusing the projection beam on the concave surface of the curved screen 6. In the embodiment illustrated, the screen 6 is shown as having a cylindrical surface, and the axis of the cylinder also coincides with the center of rotation 4 of the lens holders 5, 5' and 5". The gate aperture is indicated diagrammatically by the space between the members 7 and 7', which may be assumed to constitute the ends of the gate, and the annular aperture of the gate is assumed to be 135°. The arc of the projection screen 6 is assumed to be 120°.

The first film image frame to be projected lies between the lines A and J, and the second film image frame to be projected lies between the lines AA and JJ, the latter of which coincides with the line A, as shown. For convenience, the thickness of the film has been exaggerated and these two film image frames have been cross-hatched in opposite directions on the drawings so that they may be readily distinguishable.

As previously stated, Figure 1 illustrates the positions of the elements at the beginning of projection of film image frame A—J, and it will be observed that the trailing edge A of said frame is in line with the entrance edge of the gate aperture, and the leading edge J of said frame is spaced 60° from the trailing edge. The entire area of the first frame, therefore, is exposed to the gate aperture. At this stage, the leading edge of the beam of light X used for projection purposes, and which is represented in Figures 1 to 5 by dot-dash construction lines, is in position to project through the trailing edge A of the first frame. Therefore, the light passing through the portion of the film image at this edge of the frame is received by the optical lens system in the lens holder 5, and is focused thereby on the screen at A'.

Figure 2:
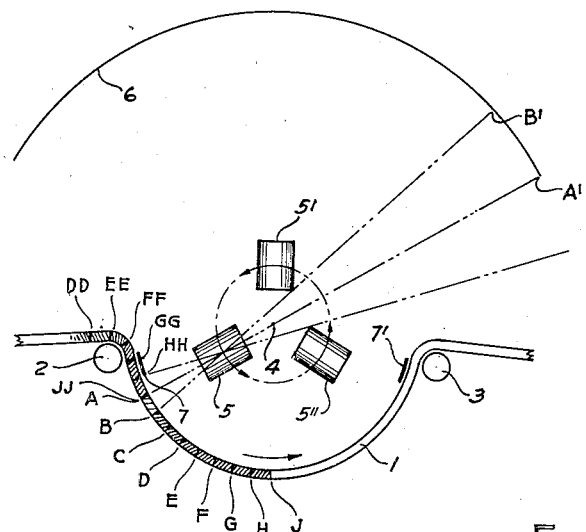

In Figure 2, the beam of light and the lens holder are assumed to have rotated through an angle of 15°, and bearing in mind that in the example selected for purposes of illustration, the ratio of the angular velocity of the beam to the angular velocity of the film in the gate is assumed to be 2 to 1, it will be seen that the film will have advanced 7½° during such movement of the light beam. Therefore, while progressing from the position of Figure 1 to the position of Figure 2, the light beam will have scanned 7½° of arc of the film frame, and the leading edge of the beam will, at the stage illustrated in Figure 2, be projecting through the region B of the film image to form a projected image in the region B' of the screen. At the same time, however, the center of the beam will be projecting through the region A of the film image to continue the projected image A' in its proper position on the screen, and the entire film image within the area between A and B will be projected onto the screen area between A' and B'.

If now it is assumed that the beam of light and the lens holder have been rotated through an additional angle of 15°, with the film frame moving meanwhile through an additional angle of 7½°, it will be apparent that the leading edge of the beam will then project through the region C of the film image to form a projected image at C' on the screen, while at the same time the center of the beam will project through the region B of the film image to continue the projected image B' in its proper position, and the trailing edge of the beam will project through the region A of the film image to continue the projected image A' in its proper position. At this stage, therefore, 30° of arc of the screen will be covered by the projected image received from 15° of arc of the film, but each point of the film image will be projected in its proper position on the screen.

Figure 3:
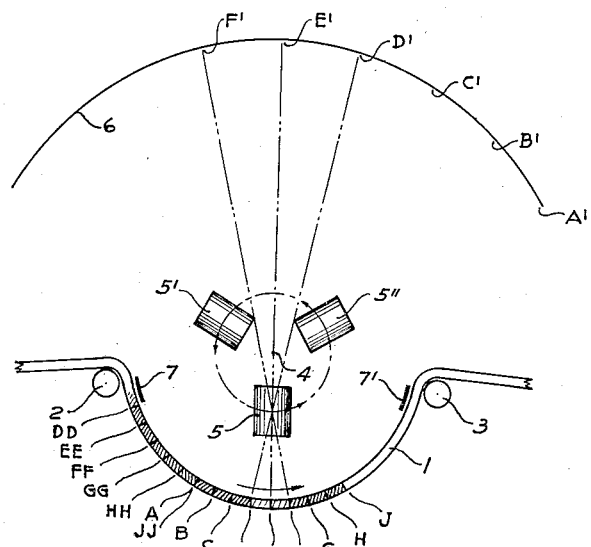

In Figure 3, the beam of light and the lens holder are assumed to have moved to a position such that the center of the beam is at the center of the gate aperture. At this time the film will have moved to a position to bring the center E of the film frame to the center of the gate aperture. Therefore, the leading edge of the beam will project through the region F to form a projected image at F', the center of the beam will project through the region E to form a projected image at E', and the trailing edge of the beam will project through the region D to form a projected image at D'. It will be apparent that as the beam of light and film approach the position shown in Figure 3, and as they move beyond the position of Figure 3, each point of the film image will be projected as a stationary screen image during the entire time it is illuminated by the beam, and despite the movement of the beam and the movement of the film, the image as a whole is perceived as a stationary image.

Figure 4:
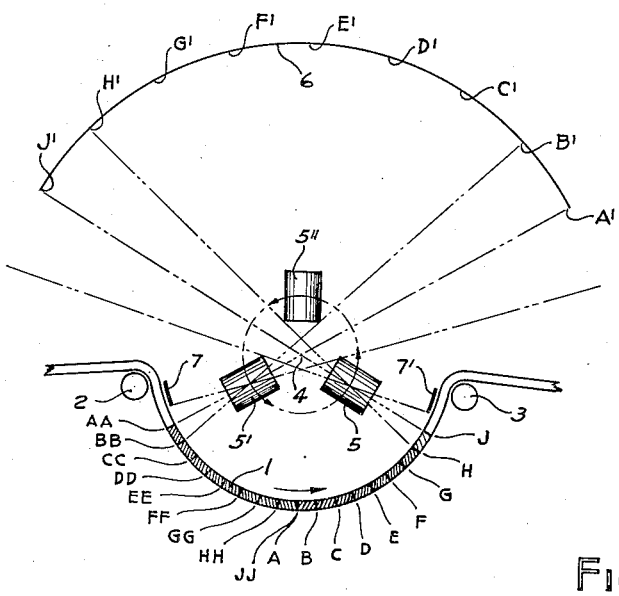
Figure 5:
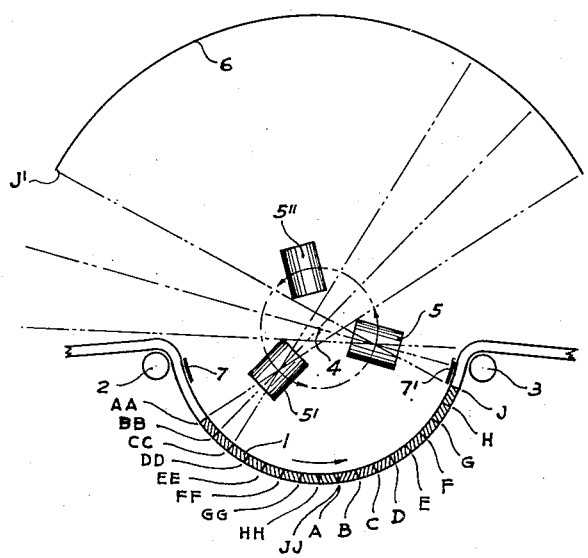

Figures 4 and 5 illustrate the stages of movement of the beam and film toward and at the completion of projection of the first film frame. Between the stages of Figures 1 and 5, the beam has moved through an angle of 150° and the film has moved through an angle of 75°. During this time the image of the 60° film frame arc has been spread over 120° of arc of the screen. It will be observed, moreover, that due to the increase in the gate aperture, each portion of the projected image is illuminated for an equal interval of time, so that the projected image is of equal brilliance throughout the entire arc of the screen.

Previous to the completion of the projection of the first film frame as shown in Figure 5, however, the projection of the second film frame by a second beam passing through a second lens system 5' has begun. As previously stated, under the conditions assumed and illustrated, the successive light beams and lens systems must be spaced at 120°, and it will be apparent that when so spaced, the image of the second film frame will be projected on the screen in the same manner as the image of the first frame, with each point thereof in its proper relative position.

Figures 6, 7 and 8 illustrate the case of non-symmetrical lens systems operating under the same conditions as previously assumed. In the case illustrated, the lens systems are assumed to have exit angles much larger than their entrance angles, and such systems must be located, as shown, in such manner that the ratio of the arc of the screen subtended by the exit angle to the arc of the gate subtended by the entrance angle is equal to the ratio of the total arc of the projection area of the screen to the angular distance between successive film frame centers. It will be apparent from the drawings that the projected images will again be projected as stationary images in the same manner and for the same reasons as before.

In order to provide a flickerless image on the screen, the light beams and lens holders should be rotated at a rate such as to project forty-eight or more images onto the screen per second.

It will be understood that the invention may be variously modified and embodied within the scope of the subjoined claims.

We claim as our invention:

1. The method of projecting a stationary picture image onto a screen which comprises continuously advancing a film having a picture image frame thereon through a curved gate having an aperture longer than said frame, and projecting a beam of light through said frame and aperture while rotating said beam at an angular velocity sufficiently greater than the angular velocity of the film in the gate to cause said beam to scan the full length of said frame while traversing the full length of said aperture, and rotating an optical lens system in line with said beam of light to focus the image scanned by said beam of light onto a curved screen, said optical lens system being so located that the ratio of the arc of the screen subtended by the exit angle of said lens system to the arc of the film subtended by the entrance angle thereof is equal to the ratio of the total arc of the projection area of the screen to the total arc of said picture image frame.

2. The method of projecting a stationary picture image onto a screen which comprises continuously advancing a film having a picture image frame thereon through a curved gate having an aperture longer than said frame, and projecting a beam of light through said frame and aperture while rotating said beam at an angular velocity sufficiently greater than the angular velocity of the film in the gate to cause said beam to scan the full length of said frame while traversing the full length of said aperture, and rotating an optical lens system in line with said beam of light to focus the image scanned by said beam of light onto a curved screen, said optical lens system being so located that its optical center is removed from its axis of rotation by a distance equal to $$\frac{Rr \sin\left(\frac{X-Y}{2}\right)}{R \sin\frac{X}{2} + r \sin\frac{Y}{2}}$$

where R is the radius of the screen, r is the radius of the gate, X is the arc of the screen subtended by the exit angle of said lens system and Y is the arc of the gate subtended by the entrance angle of said lens system.

3. The method of projecting motion pictures which comprises continuously advancing a film having a series of picture image frames thereon through a curved gate having an aperture longer than the distance between successive picture image frame centers, projecting a beam of light through said film and aperture while rotating said beam of light at an angular velocity greater than the angular velocity of the film in the gate to cause said beam of light to scan picture image frames in said gate, and maintaining the ratio of the angular velocity of the beam of light to the angular velocity of said film equal to the ratio of the arc of the projection area of said screen to the arc of the projection area of said screen minus the angular distance between centers of successive film frames in said gate, rotating an optical lens system in line with said beam of light to focus the image of each frame scanned by said beam of light onto a curved screen, said optical lens system being so located that the ratio of the arc of the screen subtended by the exit angle of said lens system to the arc of the film subtended by the entrance angle thereof is equal to the ratio of the total arc of the projection area of the screen to the angular distance between centers of successive film frames in said gate.

4. The method of projecting motion pictures which comprises continuously advancing a film having a series of picture image frames thereon through a curved gate having an aperture longer than the distance between successive picture image frame centers, projecting a beam of light through said film and aperture while rotating said beam of light at an angular velocity greater than the angular velocity of the film in the gate to cause said beam of light to scan picture image frames in said gate, and rotating an optical lens system in line with said beam of light to focus the image of each frame scanned by said beam of light onto a curved screen, said optical lens system being so located that the ratio of the arc of the screen subtended by the exit angle of said lens system to the arc of the film subtended by the entrance angle thereof is equal to the ratio of the total arc of the projection area of the screen to the angular distance between centers of successive film frames in said gate.

5. The method of projecting motion pictures which comprises continuously advancing a film having a series of picture image frames thereon through a curved gate having an aperture longer than the distance between successive picture image frame centers, projecting a plurality of spaced beams of light successively through successive frames of said series and through said aperture while rotating said beams of light at an angular velocity greater than the angular velocity of the film in the gate to cause successive beams of light to scan successive frames, the angular distance between successive beams of light being equal to the angular distance between successive frame centers multiplied by the ratio of the angular velocity of said beams of light to the angular velocity of the film in the gate, and rotating a plurality of optical lens systems each arranged in line with one of said beams of light to focus the image of each frame scanned by the respective beam of light onto a curved screen, said optical lens systems being so located that the ratio of the arc of the screen subtended by the exit angle of each lens system to the arc of the film subtended by the entrance angle thereof is equal to the ratio of the total arc of the projection area of the screen to the angular distance between centers of successive film frames in said gate.

6. The method of projecting motion pictures which comprises continuously advancing a film having a series of picture image frames thereon through a curved gate having an aperture longer than the distance between successive picture image frame centers, projecting a plurality of spaced beams of light successively through successive frames of said series and through said aperture while rotating said beams of light at an angular velocity greater than the angular velocity of the film in the gate to cause successive beams of light to scan successive frames, the angular distance between successive beams of light being equal to the angular distance between successive frame centers multiplied by the ratio of the angular velocity of said beams of light to the angular velocity of the film in the gate, and rotating a plurality of optical lens systems each arranged in line with one of said beams of light to focus the image of each frame scanned by the respective beam of light onto a curved screen, said optical lens systems being so located that their optical centers are removed from said axis of rotation by a distance equal to $$\frac{Rr \sin\left(\frac{X-Y}{2}\right)}{R \sin \frac{X}{2} + r \sin \frac{Y}{2}}$$

where $R$ is the radius of the screen, $r$ is the radius of the gate, $X$ is the arc of the screen subtended by the exit angle of said lens system and $Y$ is the arc of the gate subtended by the entrance angle of said lens system.

7. The method of projecting motion pictures which comprises continuously advancing a film having a series of picture image frames thereon through a curved gate having an aperture longer than the distance between successive picture image frame centers, projecting a beam of light through said film and aperture, and rotating an optical lens system at an angular velocity greater than the angular velocity of the film in the gate to focus the projected image on the screen, said optical lens system being so located that the ratio of the arc of said screen subtended by the exit angle of said lens system to the arc of said film subtended by the entrance angle thereof is equal to the total arc of said screen to the angular distance between successive film frame centers.

8. Apparatus for projecting motion pictures onto the concave surface of a curved screen, comprising, a curved gate, a film having a series of picture image frames thereon, means for moving said film continuously through said curved gate, an optical lens system, and means for rotating said optical lens system, said optical lens system being so located that the ratio of the arc of said screen subtended by the exit angle of said lens system to the arc of said film subtended by the entrance angle thereof is equal to the ratio of the total arc of said screen to the angular distance between successive film frame centers.

FRED WALLER.
WILLIS ROBERT DRESSER.